JAMES A. WOOD.
Improvement in Self-acting Gates.
No. 121,442. Patented Nov. 28, 1871.
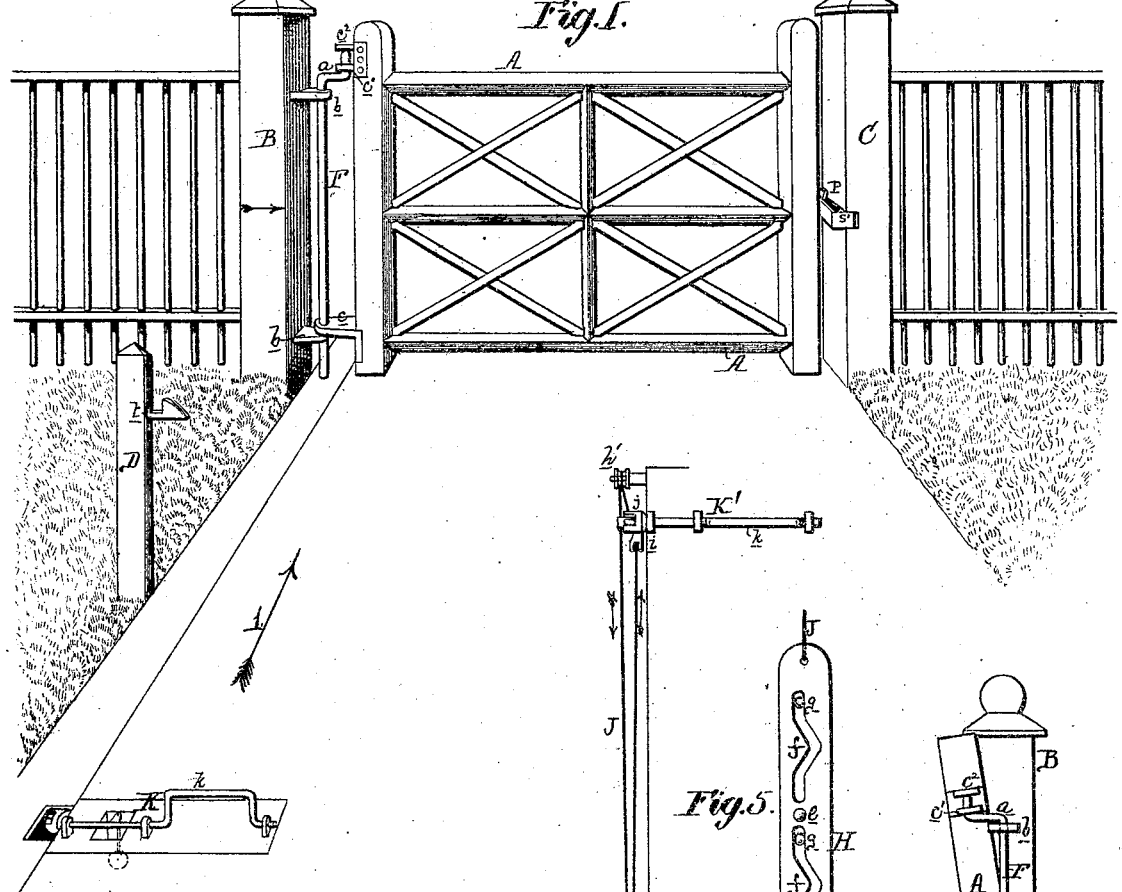
Fig. 1.
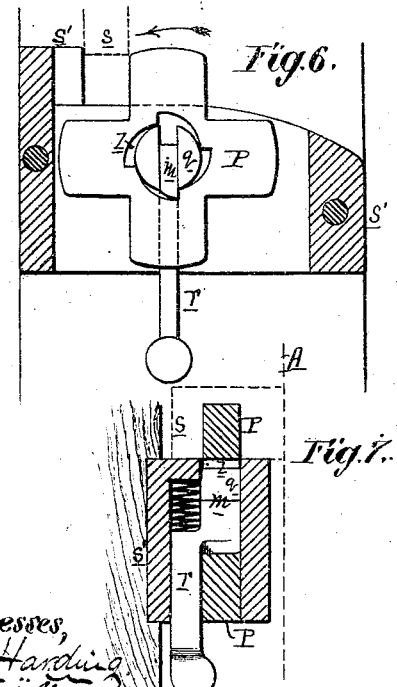
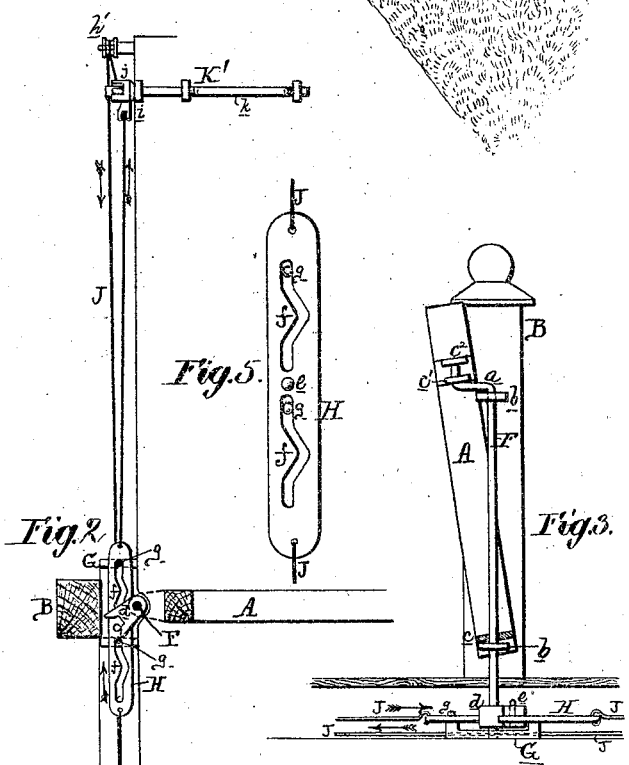
Fig. 5. Fig. 2. Fig. 3.
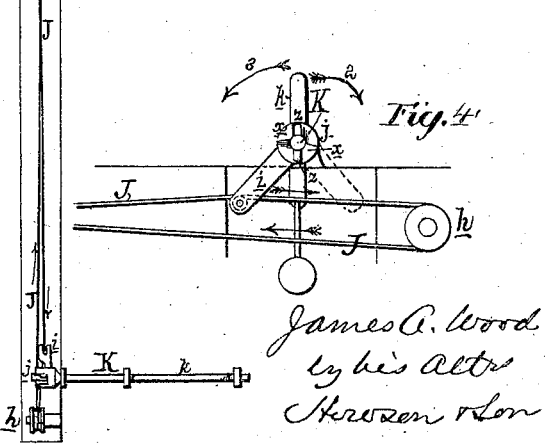
Fig. 6. Fig. 7. Fig. 4.
Witnesses:
J. R. Harding
Thos. McIlvain
James A. Wood
by his Attys
Stevens & Son
AM. PHOTO-LITHOGRAPHIC CO. N.Y. (OSBORNE'S PROCESS.)

121,442

UNITED STATES PATENT OFFICE.

JAMES A. WOOD, OF CROSSWICKS, NEW JERSEY, ASSIGNOR TO HIMSELF, JOHN BRAISLIN, AND CHARLES D. LIPPINCOTT, OF SAME PLACE.

IMPROVEMENT IN SELF-ACTING GATES.

Specification forming part of Letters Patent No. 121,442, dated November 28, 1871.

*To all whom it may concern:*

Be it known that I, JAMES A. WOOD, of Crosswicks, county of Burlington, State of New Jersey, have invented certain Improvements in Operating Gates, of which the following is a specification:

My invention consists of certain improvements, too fully described hereafter to need preliminary description, in mechanism for opening and closing farm and other gates on the approach of vehicles toward and after their passage through the gateway.

Figure 1 is a perspective view of a gate and operating devices arranged in accordance with my invention; Fig. 2, a sectional plan view of the gate and operating devices; Fig. 3, a sectional elevation on the line 1 2, Fig. 1, looking in the direction of the arrow, and showing the gate inclined or tilted preparatory to opening the same; Figs. 4 and 5, detached views of parts of the operating mechanism; and Figs. 6 and 7, enlarged sectional views of the latch by which the gate is retained in a closed position.

A represents a farm or other gate; B, the post to which it is hung; C, the post against which it is closed; and D, the post against which it is retained when opened. The gate is hung to a vertical spindle, F, cranked at its upper end at the point $a$, as plainly shown in Figs. 1 and 3, and arranged to turn in brackets or staples $b\ b$, secured to the post B. The gate is connected to the spindle by two plates or staples, $c$ and $c^1$, the latter of which is shorter than the former, and is adapted to the crank $a$. The weight of the gate is supported by a plate, $c^2$, resting upon the upper end of the spindle and thus relieving the strain upon the staples $c$ and $c^1$. The lower end of the spindle F turns in a flanged plate, G, secured to a suitable foundation, and adapted for the support and guidance of a slotted sliding bar, H, arranged at right angles or thereabout to the gate when the latter is closed. The spindle F has a forked arm or arms, $d$, extending over or both over and under the slotted bar H and embracing a pin, $e$, on the latter, as plainly shown in Fig. 2, so that a sliding motion imparted to the said bar will partially turn the spindle. The bar H has two slots, $f\ f$, through which extend pins $g\ g$ of the plate G, and the said slots are, by preference, made partly straight and partly inclined, as plainly shown in Fig. 5, so that the bar when slid longitudinally to the extent permitted by the slots may also be moved laterally, or, in other words, follow the curvilinear motion of the forked arm or arms $d$ of the spindle. This, however, is not essential, as the slots $f$ can, if desired, be made perfectly straight, providing only that the arm $d$ is sufficiently forked or slotted to allow the pin $e$ the required degree of play as the said arm is turned. It will be observed that the connection between the slotted bar and spindle is such that, although the spindle can be at any time turned by means of the bar, the latter will serve as a lock for the spindle and prevent any independent motion of the same except through the medium of the bar. The bar H is connected at its opposite ends to a cord, chain, or wire, J, which, after passing around the pulleys $h$ and $h'$, at some distance outward from the gate at either side of the latter, is again carried beneath the said bar, the latter, in other words, connecting together the opposite ends of the said cord or chain so as to make it, in effect, endless, and so that a pulling motion therefore upon any portion of the cord will slide the bar in one direction or the other. The cord is operated in such a manner as to move the sliding bar and open and close the gate by two cranked spindles, K and K', extending transversely onto the roadway at either side of the gate at any required distance outward from the latter, and connected to the said cord, close to the pulleys $h$ and $h'$, by arms $i\ i$, which extend downward from the operating crank-spindles to the cords, as plainly shown in Fig. 4. The arms $i\ i$, however, instead of being rigidly connected, as usual, to the operating crank-spindles, are hung loosely to the same in such a manner that the said crank-spindles can be turned in one direction to the extent of a quarter of a revolution without operating the arms, but so that if turned in the opposite direction the said arms will be turned also. This method of connection will be best understood by referring to Fig. 4, where it will be seen that the arm $i$ has a hub, $j$, fitted to the spindle and formed with two projections or shoulders, $x\ x$, at one end, against the opposite sides of which pins $z\ z$ on the spindle are caused to bear alternately. The spindle is acted on by a weight or spring, or both, which tends to maintain its cranked portion $k$ in the upright position shown. When, therefore, the spindle is turned in the direction of the arrow 2, Fig.

4, the arm $i$ will remain undisturbed, and the spindle on being released will spring to its original position; but if the spindle be turned in the opposite direction its pins $z$ will strike the shoulders $x\ x$ and turn the arm $i$ to the position indicated by dotted lines. The arm when thus turned can be restored to its original position by a movement of the crank-spindle in the direction of the arrow 2, as the shoulders $x\ x$ will then be in a position to be struck by the pins $z\ z$. The object of this arrangement will be hereafter explained. The latch for retaining the gate in its closed position against the post C is shown in Figs. 6 and 7, and consists of a revolving plate, P, having four or other suitable number of arms, and formed with an internal ratchet, $l$, to which is adapted a pawl, $m$, arranged to slide in a slot cut in the stock $q$, upon which the latch turns. This pawl $m$ is connected to and retained in the depressed position shown by a weighted rod, $r$, and the said pawl permits the plate P to be turned freely in the direction of the arrow, but prevents it from turning in the opposite direction. The gate is provided with a projection, $s$, which strikes and turns the plate P, and which, after passing the latter, is retained between one of the arms of the same and the edge of the casing $s'$, to which the plate is hung. The gate when thus retained can only be disengaged by lifting it over the plate P, or by turning the latter backward after raising the pawl $m$ clear of the internal ratchet $l$. When opened the gate is thrown back against the post D, which is provided with a hook, $t$, for the retention of the projection $s$ on the gate.

The method of operating the gate is as follows: The wheels of a vehicle approaching the gate in the direction of the arrow 1, Fig. 1, will strike and turn down the crank-spindle K, as indicated by the arrow 3 in Fig. 4, and will consequently turn the arm $i$, draw the cord J, and slide the slotted bar H in the direction of their respective arrows. The cranked spindle F, to which the gate is hung, will consequently be turned, as shown in Fig. 3, so as to raise the outer end of the gate clear of the latch P, and at the same time so incline it that it will swing open and against the post D, in order to regain its proper horizontal position. After passing through the gateway the wheels of the vehicle will strike and turn down the cranked spindle K', which will have the effect of drawing the slotted bar H in a direction opposite to that above described, and of consequently turning the spindle F to its original position, and of thus so tilting the gate that it will swing around and again become closed against the post C. The gate will also be opened in the same manner by the wheels of a vehicle moving toward it and passing over the cranked spindle K', and be afterward closed by means of the cranked spindle K. The method of connecting the arms $i\ i$ to the cranked spindles K and K' enables the latter to spring upward immediately after the passage of a vehicle, ready to be again depressed, without such movement having any tendency to turn the said arms. The peculiar connection also prevents any operation of the arms and parts connected therewith when one vehicle closely follows another, as it is only necessary, in such case, that the foremost vehicle should operate the several parts to open and close the gate. When it is desired to open the gate without operating either of the crank-spindles K and K' or the spindle F, the pawl $m$ is raised by means of its rod $r$, so as to enable the latch P to be turned in a direction contrary to that indicated by the arrow in Fig. 6, and thus release the gate. The gate when thus opened will have no tendency to turn the spindle F, which is locked by means of the slotted bar R, but will turn upon the said spindle until opened to the desired extent, and when released will swing to of itself.

I claim as my invention—

1. The combination of the sliding bar H with the arm or arms $d$ of the crank-spindle F.

2. The sliding bar H, limited in its movements by fixed pins $g\ g$, which enter slots $f\ f$ formed in the said bar.

3. The said slots $f\ f$ of the sliding bar, when made partly straight and partly inclined, substantially as and for the purpose specified.

4. The combination of the slotted bar H, the forked arm or arms $d$ of the spindle F, and a cord, wire, or chain, J, passing around pulleys $h$ and $h'$, and by which the said bar H is operated, substantially in the manner described.

5. The combination of the arm $i$ having a hub with shoulders $x\ x$, and the crank-spindle having projections or pins $z\ z$, and arranged and operating with the arm $i$, as set forth.

6. The combination of the latch P, its internal ratchet $l$, and sliding pawl $m$, all arranged upon a gate-post, and the stop $s$ upon the gate, substantially as described.

In testimony whereof I have signed my name to this specification in the presence of two subscribing witnesses.

JAMES A. WOOD.

Witnesses:
 HUDSON S. ELLIS,
 THOS. SEXTON.